(12) United States Patent
Huh et al.

(10) Patent No.: US 10,815,406 B2
(45) Date of Patent: Oct. 27, 2020

(54) ADHESIVE COMPOSITION FOR OPTICAL USE

(71) Applicant: LG Chem, Ltd., Seoul (KR)

(72) Inventors: Jin Young Huh, Daejeon (KR); Kyung Joon Yoon, Daejeon (KR); Bo Ra Yeon, Daejeon (KR); Hyun Mee Kim, Daejeon (KR); Jang Soon Kim, Daejeon (KR)

(73) Assignee: LG Chem, Ltd. (KR)

( * ) Notice: Subject to any disclaimer, the term of this patent is extended or adjusted under 35 U.S.C. 154(b) by 235 days.

(21) Appl. No.: 15/771,744

(22) PCT Filed: Apr. 11, 2017

(86) PCT No.: PCT/KR2017/003929
§ 371 (c)(1),
(2) Date: Apr. 27, 2018

(87) PCT Pub. No.: WO2017/179899
PCT Pub. Date: Oct. 19, 2017

(65) Prior Publication Data
US 2018/0258331 A1    Sep. 13, 2018

(30) Foreign Application Priority Data

Apr. 12, 2016  (KR) .................. 10-2016-0045167

(51) Int. Cl.
*C09J 175/14*    (2006.01)
*C09J 175/16*    (2006.01)
(Continued)

(52) U.S. Cl.
CPC ........ *C09J 175/14* (2013.01); *C08G 18/8175* (2013.01); *C08K 5/0016* (2013.01);
(Continued)

(58) Field of Classification Search
CPC ..... C09J 133/08; C09J 7/30; C09J 7/38; C09J 4/00; C09J 11/06; C09J 175/14;
(Continued)

(56) References Cited

U.S. PATENT DOCUMENTS

2009/0065140 A1\* 3/2009 Osoegawa ............ C08F 290/06
                                                                156/275.5
2012/0177912 A1   7/2012 Kim et al.
(Continued)

FOREIGN PATENT DOCUMENTS

CN     103998548 A    8/2014
JP     2003241032 A   8/2003
(Continued)

OTHER PUBLICATIONS

Search report from International Application No. PCT/KR2017/003929, dated Nov. 28, 2017.

*Primary Examiner* — Ruiyun Zhang
(74) *Attorney, Agent, or Firm* — Lerner, David, Littenberg, Krumholz & Mentlik, LLP

(57) ABSTRACT

Provided is an adhesive composition for optical use, the adhesive composition including: a monofunctional urethane (meth)acrylate-based oligomer; and a polyfunctional urethane (meth)acrylate-based oligomer, in which a weight ratio of the monofunctional urethane (meth)acrylate-based oligomer and the polyfunctional urethane (meth)acrylate-based oligomer is 1:2 to 1:4.

12 Claims, 1 Drawing Sheet

(51) Int. Cl.

| | | |
|---|---|---|
| *C08G 18/81* | (2006.01) | |
| *C09J 133/14* | (2006.01) | |
| *C09J 11/06* | (2006.01) | |
| *C09J 11/08* | (2006.01) | |
| *C08K 5/00* | (2006.01) | |
| *C08L 47/00* | (2006.01) | |
| *C09J 133/10* | (2006.01) | |

(52) U.S. Cl.
CPC ............... *C08L 47/00* (2013.01); *C09J 11/06* (2013.01); *C09J 11/08* (2013.01); *C09J 133/14* (2013.01); *C09J 175/16* (2013.01); *C09J 133/10* (2013.01); *Y10T 428/10* (2015.01); *Y10T 428/1045* (2015.01); *Y10T 428/1077* (2015.01)

(58) Field of Classification Search
CPC .. C09J 175/16; C08G 18/0885; G02F 1/1333; G02F 1/133308; G02F 2001/133311; Y10T 428/10; Y10T 428/1045; Y10T 428/1077
USPC ....... 428/1.1, 1.5, 1.54; 156/275.5; 522/184; 526/329.7; 524/195
See application file for complete search history.

(56) References Cited

U.S. PATENT DOCUMENTS

| | | |
|---|---|---|
| 2013/0273266 A1 | 10/2013 | Niiyama et al. |
| 2014/0290849 A1 | 10/2014 | Hayashi et al. |
| 2016/0091791 A1 | 3/2016 | Iwata et al. |
| 2016/0177054 A1 | 6/2016 | Hayashi et al. |

FOREIGN PATENT DOCUMENTS

| | | |
|---|---|---|
| JP | 2006213746 A | 8/2006 |
| JP | 4482463 B2 | 6/2010 |
| JP | 2012046658 A | 3/2012 |
| JP | 2012107130 A | 6/2012 |
| JP | 2012144726 A | 8/2012 |
| JP | 2012251030 A | 12/2012 |
| JP | 2013522453 A | 6/2013 |
| JP | 2014118450 A | 6/2014 |
| JP | 2014237745 A | 12/2014 |
| JP | 2015114545 A | 6/2015 |
| JP | 5757291 B2 | 7/2015 |
| KR | 20130131544 A | 12/2013 |
| KR | 101397698 B1 | 5/2014 |
| KR | 20150005552 A | 1/2015 |
| KR | 20160014735 A | 2/2016 |

\* cited by examiner

[Figure 1]
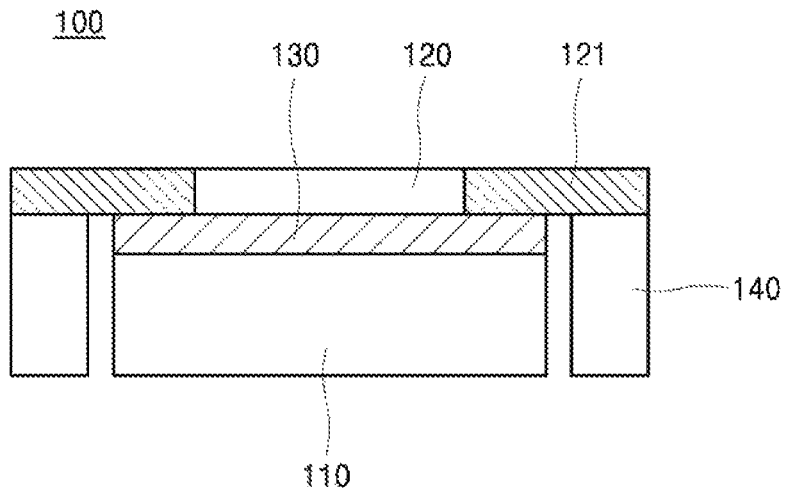
[Figure 2]
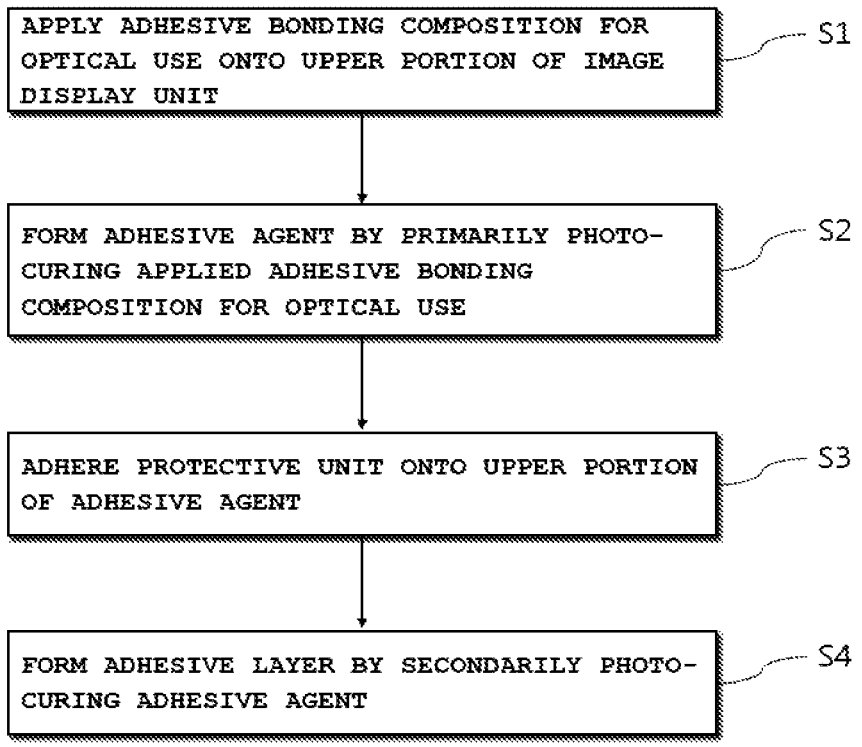

ADHESIVE COMPOSITION FOR OPTICAL USE

CROSS-REFERENCE TO RELATED APPLICATIONS

The present application is a national phase entry under 35 U.S.C. § 371 of International Application No. PCT/KR2017/003929 filed Apr. 11, 2017, which claims priority from Korean Patent Application No. 10-2016-0045167 filed on Apr. 12, 2016, the disclosures of which are incorporated herein by reference.

Technical Field

The present invention relates to an adhesive composition for optical use.

BACKGROUND ART

In an image display device such as a TV set, a computer, and a mobile device, there exists an air layer in which a space between an image display unit and a protective unit is filled with air, and the air layer may significantly degrade the visibility. Thus, for example, the visibility is improved by filling the air layer with a transparent acrylic cured product, and the like, a transparent cured product is typically adhered in the form of an adhesive film or an adhesive sheet on an image display unit, and subsequently, a transparent cured product is interposed between the image display unit and a protective unit by adhering the protective unit on the adhesive film or the adhesive sheet.

Since the adhesive film or the adhesive sheet is not easily applied to various structures and it is difficult to remove bubbles during the adhesion, the step absorbency capable of absorbing a printing step by a deco film, and the like deteriorates.

Thus, a bonding method of photo-curing a liquid bonding composition in a state where the liquid bonding composition is filled between the image display unit and the protective unit has been used.

DETAILED DESCRIPTION OF THE INVENTION

Technical Problem

The present specification provides an adhesive composition for optical use.

Technical Solution

An exemplary embodiment of the present invention provides an adhesive composition for optical use, the adhesive composition including: a monofunctional urethane (meth)acrylate-based oligomer; and a polyfunctional urethane (meth)acrylate-based oligomer, in which a weight ratio of the monofunctional urethane (meth)acrylate-based oligomer and the polyfunctional urethane (meth)acrylate-based oligomer is 1:2 to 1:4.

The monofunctional urethane (meth)acrylate-based oligomer may include one or more selected from the group consisting of a polybutadiene urethane (meth)acrylate oligomer, an epoxy urethane (meth)acrylate oligomer, a polyester urethane (meth)acrylate oligomer, and a polyether urethane (meth)acrylate oligomer.

The monofunctional urethane (meth)acrylate-based oligomer may have a weight average molecular weight (Mw) of 10,000 g/mol to 20,000 g/mol.

The polyfunctional urethane (meth)acrylate-based oligomer may include one or more selected from the group consisting of a polybutadiene urethane (meth)acrylate oligomer, an epoxy urethane (meth)acrylate oligomer, a polyester urethane (meth)acrylate oligomer, and a polyether urethane (meth)acrylate oligomer.

The polyfunctional urethane (meth)acrylate-based oligomer may have a weight average molecular weight (Mw) of 30,000 g/mol to 40,000 g/mol.

A total content of the monofunctional urethane (meth)acrylate-based oligomer and the polyfunctional urethane (meth)acrylate-based oligomer may be 9 wt % to 30 wt % based on the adhesive composition for optical use.

The adhesive composition for optical use may further include a hydroxy group-containing (meth)acrylate-based monomer.

The hydroxy group-containing (meth)acrylate-based monomer may include one or more selected from the group consisting of 2-hydroxyethyl (meth)acrylate, 4-hydroxybutyl (meth)acrylate, 2-hydroxypropyl (meth)acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate.

A content of the hydroxy group-containing (meth)acrylate-based monomer may be 3 wt % to 8 wt % based on the adhesive composition for optical use.

The adhesive composition for optical use may further include one or more selected from the group consisting of an alkyl group-containing (meth)acrylate-based monomer and a cycloalkyl group-containing (meth)acrylate-based monomer.

The contents of the alkyl group-containing (meth)acrylate-based monomer and the cycloalkyl group-containing (meth)acrylate-based monomer may be each 20 wt % to 40 wt % based on the adhesive composition for optical use.

The adhesive composition for optical use may further include one or more additives selected from the group consisting of a plasticizer, an adhesive promoter, and a photoinitiator.

The plasticizer may include one or more selected from the group consisting of an epoxy-based plasticizer, a fatty acid ester-based plasticizer, a polyester-based plasticizer, a polybutadiene-based plasticizer, and an ether-based plasticizer.

A content of the plasticizer may be 10 wt % to 20 wt % based on the adhesive composition for optical use.

Advantageous Effects

The adhesive composition for optical use may implement an effect in that the deformation is slight and dimensional stability is improved, due to the small cure shrinkage when the adhesive composition for optical use is photo-cured.

Specifically, the adhesive composition for optical use controls a mixing ratio of a monofunctional urethane acrylate-based oligomer and a polyfunctional urethane acrylate-based oligomer, and includes a methacrylate which has a slow reaction rate. Therefore, it is possible to prevent a deformation due to the shrinkage and implement excellent dimensional stability, by decreasing the cure shrinkage when carrying out the pre-curing and the main-curing.

BRIEF DESCRIPTION OF DRAWINGS

FIG. 1 schematically illustrates a structure of a molding article which uses an adhesive composition for optical use according to the present invention.

FIG. 2 is a schematic process flow chart of a method of multistage curing the adhesive composition for optical use according to the present invention.

MODE FOR INVENTION

The benefits and features of the present invention, and the methods of achieving the benefits and features will become apparent with reference to Examples to be described below. However, the present invention is not limited to the Examples to be disclosed below, but may be implemented in various other forms, and the present Examples are only provided for rendering the disclosure of the present invention complete and for fully representing the scope of the invention to a person with ordinary skill in the technical field to which the present invention pertains, and the present invention will be defined only by the scope of the claims. Throughout the specification, like reference numerals indicate like constituent elements.

In the drawings, the thicknesses of several layers and regions are enlarged so as to clearly express the layers and the regions. Moreover, in the drawings, the thicknesses of some layers and regions are exaggerated for convenience of explanation.

Further, in the present specification, when it is described that a part such as a layer, a film, a region, and a plate is present "on" or "at an upper portion of" another part, the case includes not only a case where the part is present "immediately on" another part, but also a case where still another part is present therebetween. In addition, when it is described that a part is present "immediately on" another part, the case means that no other part is present therebetween. Furthermore, when it is described that a part such as a layer, a film, a region, and a plate is present "under" or "at a lower portion of" another part, the case includes not only a case where the part is present "immediately under" another part, but also a case where still another part is present therebetween. In addition, when it is described that a part is present "immediately under" another part, the case means that no other part is present therebetween.

In the present specification, the (meth)acrylate means acrylate or methacrylate.

An exemplary embodiment of the present invention provides an adhesive composition for optical use, the adhesive composition including: a monofunctional urethane (meth)acrylate-based oligomer; and a polyfunctional urethane (meth)acrylate-based oligomer, in which a weight ratio of the monofunctional urethane (meth)acrylate-based oligomer and the polyfunctional urethane (meth)acrylate-based oligomer is 1:2 to 1:4.

In the present specification, the monofunctional urethane (meth)acrylate-based oligomer may mean an oligomer including one (meth)acrylate group. Specifically, the (meth) acrylate group includes one double bond, and the double bond may form a cross-linking structure with another monomer or dimer, and the like by carrying out a radical reaction.

The monofunctional urethane (meth)acrylate-based oligomer may serve to decrease a cure shrinkage of the adhesive composition for optical use as compared to bifunctional or more polyfunctional urethane (meth)acrylate-based oligomers by controlling the number of functional groups which participate in a photo-curing reaction, and may implement an effect of improving adhesive force and an advantage in that the viscosity of the adhesive composition for optical use is easily adjusted.

According to an exemplary embodiment of the present invention, the monofunctional urethane (meth)acrylate-based oligomer may include one or more selected from the group consisting of a polybutadiene urethane (meth)acrylate oligomer, an epoxy urethane (meth)acrylate oligomer, a polyester urethane (meth)acrylate oligomer, and a polyether urethane (meth)acrylate oligomer.

According to an exemplary embodiment of the present invention, the monofunctional urethane (meth)acrylate-based oligomer may have a weight average molecular weight (Mw) of about 10,000 g/mol to about 20,000 g/mol. A cure shrinkage may be effectively decreased while an appropriate viscosity is maintained by maintaining the weight average molecular weight of the monofunctional urethane (meth)acrylate-based oligomer within the range, excellent adhesive physical properties may be implemented, and an effect in that the viscosity is easily adjusted may be easily secured. When the weight average molecular weight of the monofunctional urethane (meth)acrylate-based oligomer is less than the range, the viscosity is so extremely low that there may occur difficulty in molding and there may occur a problem in that the cure shrinkage is increased. When the weight average molecular weight of the monofunctional urethane (meth)acrylate-based oligomer is more than the range, the effect of decreasing the cure shrinkage may deteriorate, and there may be a problem in that it is difficult to adjust the viscosity and control the adhesive force.

According to an exemplary embodiment of the present invention, the adhesive composition for optical use includes not only a monofunctional urethane (meth)acrylate-based oligomer, but also a polyfunctional urethane (meth)acrylate-based oligomer.

According to an exemplary embodiment of the present invention, the polyfunctional urethane (meth)acrylate-based oligomer may mean an oligomer including at least two or more (meth)acrylate groups, and may be, for example, a bifunctional to tetrafunctional urethane (meth)acrylate-based oligomer.

The polyfunctional urethane (meth)acrylate-based oligomer may implement excellent durability and cure shrinkage when the adhesive composition for optical use is cured, and may secure an effect of improving adhesive force and an advantage in that the viscosity is easily adjusted.

According to an exemplary embodiment of the present invention, the polyfunctional urethane (meth)acrylate-based oligomer may include one or more selected from the group consisting of a polybutadiene urethane (meth)acrylate oligomer, an epoxy urethane (meth)acrylate oligomer, a polyester urethane (meth)acrylate oligomer, and a polyether urethane (meth)acrylate oligomer.

According to an exemplary embodiment of the present invention, the polyfunctional urethane (meth)acrylate-based oligomer may have a weight average molecular weight (Mw) of about 30,000 g/mol to about 40,000 g/mol. By maintaining the weight average molecular weight of the polyfunctional urethane (meth)acrylate-based oligomer within the range, it is possible to maintain excellent hardness and durability during the curing, and it is possible to secure improved adhesive physical properties and an effect in that the viscosity is easily adjusted. In the case where the weight average molecular weight of the polyfunctional urethane (meth)acrylate-based oligomer is less than or more than the range, when the adhesive composition for optical use is applied to a final product after being cured, the tensile strength and elastic force become weak, and as a result, there may occur a deformation according to the external impact or conditions, and durability may deteriorate.

As described above, the adhesive composition for optical use contains both a monofunctional urethane (meth)acrylate-based oligomer and a polyfunctional urethane (meth)acrylate-based oligomer, thereby implementing excellent physical properties in terms of processability, adhesiveness, reduction of cure shrinkage, and the like.

When the adhesive composition for optical use only includes the monofunctional urethane (meth)acrylate-based oligomer, the viscosity of the adhesive composition for optical use is so extremely low that there may occur difficulty in molding, reliability of product performance may deteriorate due to the difficulty in adjusting adhesive force, and there may occur a problem in that hardness and tensile force deteriorate.

In addition, when the adhesive composition for optical use only includes the polyfunctional urethane (meth)acrylate-based oligomer, the cure shrinkage is so extremely high that there may occur a deformation and unevenness, and the like of a product to which the adhesive composition for optical use is applied, and the hardness is so extremely high that there may occur a problem in that the adhesion deteriorates due to the occurrence of deformation according to an external temperature and environment.

According to an exemplary embodiment of the present invention, a weight ratio of the monofunctional urethane (meth)acrylate-based oligomer and the polyfunctional urethane (meth)acrylate-based oligomer in the adhesive composition for optical use may be 1:2 to 1:4. Specifically, a weight ratio of the monofunctional urethane (meth)acrylate-based oligomer and the polyfunctional urethane (meth)acrylate-based oligomer in the adhesive composition for optical use may be 1:2 to 1:3.5 or 1:2 to 1:3.

The monofunctional urethane (meth)acrylate-based oligomer and the polyfunctional urethane (meth)acrylate-based oligomer are mixed at a weight ratio within the range, thereby implementing appropriate hardness and durability during the curing and simultaneously decreasing the cure shrinkage.

When the ratio of mixing the monofunctional urethane (meth)acrylate-based oligomer and the polyfunctional urethane (meth)acrylate-based oligomer is out of the range, the cure shrinkage may be increased, and there may occur a problem in that adhesive physical properties deteriorate and it is difficult to control the viscosity. In addition, during the curing, mechanical properties such as durability and hardness may deteriorate, and there may occur a problem of a product deformation according to an increase in cure shrinkage.

According to an exemplary embodiment of the present invention, the total content of the monofunctional urethane (meth)acrylate-based oligomer and the polyfunctional urethane (meth)acrylate-based oligomer may be about 9 wt % to about 30 wt % based on the adhesive composition for optical use. Specifically, the total content of the monofunctional urethane (meth)acrylate-based oligomer and the polyfunctional urethane (meth)acrylate-based oligomer may be about 15 wt % to about 30 wt %, or about 20 wt % to about 25 wt %, based on the adhesive composition for optical use.

By maintaining the total content of the monofunctional urethane (meth)acrylate-based oligomer and the polyfunctional urethane (meth)acrylate-based oligomer within the range, the cure shrinkage may be decreased by controlling the number of functional groups which participate in a bonding reaction during the curing, and simultaneously, an effect of excellent adhesive physical properties and tensile strength may be implemented. When the total content of the monofunctional urethane (meth)acrylate-based oligomer and the polyfunctional urethane (meth)acrylate-based oligomer is less than the range, durability and surface strength, and the like may deteriorate during the curing, and the cure shrinkage or hardness is increased so extremely that there may occur a problem with mechanical properties, and the viscosity of the adhesive composition for optical use is decreased so extremely that there may occur difficulty in the process. When the total content of the monofunctional urethane (meth)acrylate-based oligomer and the polyfunctional urethane (meth)acrylate-based oligomer is more than the range, the cure shrinkage is increased and it is difficult to control adhesive force and hardness, and the viscosity is so extremely high that there may occur difficulty in the process.

According to an exemplary embodiment of the present invention, the adhesive composition for optical use may further include a hydroxy group-containing (meth)acrylate-based monomer.

The hydroxy group-containing (meth)acrylate-based monomer included in the adhesive composition for optical use has a low reaction rate and thus may appropriately adjust the rate at which the adhesive composition for optical use is photo-cured, and as a result, the cure shrinkage may be easily decreased and the adhesive composition for optical use may also be advantageous in terms of physical property stability.

Specifically, the hydroxy group-containing (meth)acrylate-based monomer, which has relatively slow reactivity, easily adjusts the rate of the photo-curing reaction as compared to the acrylate-based monomer which has fast reactivity generally used, and thus may be advantageous in suppressing a deformation of the adhesive composition for optical use and implementing dimensional stability.

Accordingly, there is an advantage in that the cure shrinkage may be further decreased by applying a multistage curing method because it is possible to easily adjust a curing degree by each photo-curing reaction when multistage curing for the adhesive composition for optical use is carried out, and it is possible to prevent a deformation in a product to which the adhesive composition for optical use is applied.

According to an exemplary embodiment of the present invention, the hydroxy group-containing (meth)acrylate-based monomer may include one or more selected from the group consisting of 2-hydroxyethyl (meth)acrylate, 4-hydroxybutyl (meth)acrylate, 2-hydroxypropyl (meth)acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate.

According to an exemplary embodiment of the present invention, the content of the hydroxy group-containing (meth)acrylate-based monomer may be 3 wt % to 8 wt % based on the adhesive composition for optical use. Specifically, according to an exemplary embodiment of the present invention, the content of the hydroxy group-containing (meth)acrylate-based monomer may be 4 wt % to 7 wt % based on the adhesive composition for optical use.

By maintaining the wt % range of the hydroxy group-containing (meth)acrylate-based monomer within the range, an appropriate viscosity is implemented, and as a result, the moldability is improved, and simultaneously, the cure shrinkage may be implemented at a sufficiently low level, and excellent optical properties may be easily implemented. Furthermore, by maintaining the wt % range of the hydroxy group-containing (meth)acrylate-based monomer within the range, a whitening phenomenon may be effectively prevented, and excellent physical properties may be maintained over the long term. When the wt % range of the hydroxy group-containing (meth)acrylate-based monomer is less than the range, the cure shrinkage may be increased during the secondary curing, and a whitening phenomenon may occur in the solid phase after the curing. When the wt % range of the hydroxy group-containing (meth)acrylate-based monomer is more than the range, mechanical properties may deteriorate when the adhesive composition for optical use is cured, and whitening may occur in the liquid phase before the curing.

According to an exemplary embodiment of the present invention, the adhesive composition for optical use may further include one or more selected from the group consisting of an alkyl group-containing (meth)acrylate-based monomer and a cycloalkyl group-containing (meth)acrylate-based monomer. Specifically, according to an exemplary embodiment of the present invention, the adhesive composition for optical use may further include a cycloalkyl group-containing (meth)acrylate-based monomer.

According to an exemplary embodiment of the present invention, the alkyl group-containing (meth)acrylate-based monomer may be a (meth)acrylate having an alkyl group having 1 to 20 carbon atoms. Specifically, the (meth)acrylate monomer may include one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate.

According to an exemplary embodiment of the present invention, the cycloalkyl group may include a carbon ring structure in which an unsaturated bond is not present in the functional group, and may include a monocyclic ring or polycyclic ring which has 2 to 20 carbon atoms.

According to an exemplary embodiment of the present invention, the cycloalkyl group-containing (meth)acrylate-based monomer may include one or more selected from the group consisting of cyclohexyl acrylate (CHA), cyclohexyl methacrylate (CHMA), isobornyl acrylate (IBOA), isobornyl methacrylate (IBOMA), and 3,3,5-trimethyl cyclohexyl acrylate (TMCHA).

According to an exemplary embodiment of the present invention, the contents of the alkyl group-containing (meth) acrylate-based monomer and the cyclcoalkyl group-containing (meth)acrylate-based monomer in the adhesive composition for optical use may be each about 20 wt % to about 40 wt %, or about 20 wt % to 35 wt %, or 20 wt % or more and 30 wt % or less, based on the adhesive composition for optical use.

When the content(s) of the alkyl group-containing (meth) acrylate-based monomer and/or the cyclcoalkyl group-containing (meth)acrylate-based monomer is/are within the range, the adhesive composition for optical use may be easily dealt with by easily adjusting the viscosity of the adhesive composition for optical use, and it is possible to serve to improve heat resistance and high-temperature adhesive force of the adhesive composition for optical use.

According to an exemplary embodiment of the present invention, the adhesive composition for optical use may include the alkyl group-containing (meth)acrylate-based monomer and/or the cycloalkyl group-containing (meth) acrylate-based monomer together with the hydroxy group-containing (meth)acrylate-based monomer.

According to an exemplary embodiment of the present invention, the adhesive composition for optical use may further include one or more additives selected from the group consisting of a plasticizer, an adhesive promoter, and a photoinitiator, and the additives are not limited thereto.

Since the adhesive composition for optical use includes a polyfunctional urethane (meth)acrylate-based oligomer, there is a concern in that the cure shrinkage becomes extremely high. Thus, the adhesive composition for optical use further includes the plasticizer, thereby decreasing the cure shrinkage and implementing an effect in that the viscosity is easily adjusted.

According to an exemplary embodiment of the present invention, the plasticizer may include one or more selected from the group consisting of an epoxy-based plasticizer, a fatty acid ester-based plasticizer, a polyester-based plasticizer, a polybutadiene-based plasticizer, and an ether-based plasticizer, but is not limited thereto.

According to an exemplary embodiment of the present invention, the content of the plasticizer may be about 10 wt % to about 20 wt % based on the adhesive composition for optical use. Specifically, the content of the plasticizer may be about 15 wt % to about 20 wt % based on the adhesive composition for optical use. By maintaining the content of the plasticizer within the range, it is possible to prevent a migration of the plasticizer after the adhesive composition for optical use is applied to a product, and as a result, it is possible to implement excellent adhesive force, an excellent surface appearance, and an advantage in that a uniform performance can be implemented over a long period of time, an improved wetting property may be implemented, and the viscosity may be easily adjusted. When the content of the plasticizer is less than the range, dimensional stability may deteriorate because an excessive shrinkage occurs during the curing of the adhesive composition for optical use, and there may occur a problem during the process, such as generation of bubbles when plates are joined together after the pre-curing because it is difficult to adjust the viscosity and the wetting property deteriorates. When the content of the plasticizer is more than the range, the plasticizer migrates in a product to which the adhesive composition for optical use is applied, and as a result, the performance may deteriorate, and there may occur a problem during the process, such as overflow when plates are joined after the pre-curing because the viscosity is extremely low or the wetting property is extremely high.

The adhesive promoter may serve to improve adhesive force, and as the adhesive promoter, it is possible to include one or more selected from a rosin ester-based resin, a $C_5$-based petroleum resin, a $C_9$-based petroleum resin, and a terpene-based resin.

The adhesive composition for optical use may be an adhesive composition for an image display device.

Referring to FIG. 1, an image display device 100 may have a structure in which a bonding layer 130 including a photo-cured product of the adhesive composition for optical use is disposed between an image display unit 110 and a protective unit 120. The image display unit 110 may be a liquid crystal display (LCD), and for example, an uppermost layer of the image display unit 110 may be a polarizing film, but is not limited thereto. Further, the protective unit 120 may be a glass substrate or a transparent plastic substrate, but is not limited thereto. A light shielding unit 121 may be formed at the edge of the protective unit 120.

Furthermore, the image display device 100 may further include a fixing jig 140 which fixes the protective unit 120, and the like. As the fixing jig 140, the type publicly known in the art may be used, and the fixing jig 140 is not particularly limited.

A bonding layer including the photo-cured product of the adhesive composition for optical use may be implemented by a multistage curing of the adhesive composition for optical use.

FIG. 2 schematically illustrates a process flow chart of a method for multistage curing an adhesive composition for optical use according to an exemplary embodiment of the present invention.

The method for multistage curing an adhesive composition for optical use may include: applying the adhesive composition for optical use onto an upper portion of an image display unit (S1); forming an adhesive agent by primarily photo-curing the applied adhesive composition for optical use (S2); adhering a protective unit onto the upper portion of the adhesive agent (S3); and forming a bonding layer by secondarily photo-curing the adhesive agent interposed between the image display unit and the protective unit (S4).

The multistage curing method may be, for example, a two-stage curing method of primarily and secondarily curing the composition. When multistage curing for the adhesive composition for optical use is carried out, there is an advantage in that the photo-cure shrinkage may be further decreased by applying a multistage curing method because the curing degree by each photo-curing reaction may be easily adjusted.

In addition, excellent productivity and economic efficiency may be implemented by preventing an overflow phenomenon via the multistage curing method to decrease a raw material loss rate, time, and costs, and simultaneously, a uniform bonding performance may be implemented over a long period of time because the photo-cure shrinkage is significantly lowered to further prevent a warpage phenomenon.

In the adhesive composition for optical use, there may occur a primary photo-curing shrinkage and a secondary photo-curing shrinkage due to the multistage curing.

Specifically, for the primary photo-cure shrinkage due to the primary photo-curing, a difference between a height in a composition state and a height during the primary photo-curing was measured by applying the adhesive composition for optical use onto a circular frame with a diameter of 1 cm and a height of 1 mm, irradiating the adhesive composition for optical use with a wavelength of 365 nm using an LED lamp from the lower part, and using EU201 manufactured by SENTECH Co., Ltd. The primary photo-cure shrinkage may be about 4% or less, and may also be, for example, about 3% to about 4%.

In addition, for the secondary photo-cure shrinkage due to the secondary photo-curing, a difference between a height in a composition state and a height after the photo-curing by means of a mercury lamp was measured by applying the adhesive composition for optical use onto a circular frame with a diameter of 1 cm and a height of 1 mm, photo-curing the adhesive composition for optical use using the mercury lamp from the lower part, and using EU201 manufactured by SENTECH Co., Ltd. The secondary photo-cure shrinkage may be about 4.5% or less, and may also be, for example, about 3.5% to about 4.5%.

In the present specification, the photo-cure shrinkage is a difference between the primary photo-cure shrinkage and the secondary photo-cure shrinkage, and may be about 1.0% or less, and may also be, for example, about 0.5% to about 1.0%, or about 0.5% to about 0.9%.

The photo-cure shrinkage has a low photo-cure shrinkage within the range to further decrease stress generated in a product to which the adhesive composition for optical use is applied, and simultaneously, to decrease the content of the plasticizer as described above, and as a result, an excellent surface appearance and a uniform bonding performance may be implemented over a long period of time. When the photo-cure shrinkage is out of the range, generated stress is increased, and as a result, a warpage phenomenon, yellowing, or unevenness may occur.

Hereinafter, specific examples of the present invention will be suggested. However, the Examples described below are only provided for specifically exemplifying or explaining the present invention, and the present invention is not limited thereby.

EXAMPLES AND COMPARATIVE EXAMPLES

Example 1

An adhesive composition for optical use with a total content of a monofunctional urethane acrylate-based oligomer and a polyfunctional urethane acrylate-based oligomer being 21 wt % was prepared by including 27 wt % of isobornyl acrylate, 2 wt % of isobornyl methacrylate, 5.5 wt % of a monofunctional urethane acrylate-based oligomer (NS017, Mw: about 17,000, BNTM Co., Ltd.), 15.5 wt % of a bifunctional urethane acrylate-based oligomer (KS1113, Mw: about 37,000, LG CHEM), 30 wt % of an adhesive promoter (ARAKAWA Chemical, P-90), 15 wt % of a plasticizer (non-phthalates, BASF, DINCH), 4 wt % of hydroxy butyl acrylate (Osaka Organic Chemical Industry Ltd.), and other additives such as a photoinitiator.

Example 2

An adhesive composition for optical use with a total content of a monofunctional urethane acrylate-based oligomer and a polyfunctional urethane acrylate-based oligomer being 23 wt % was prepared by including 20.5 wt % of isobornyl acrylate, 6 wt % of a monofunctional urethane acrylate-based oligomer (NS017, Mw: about 17,000, BNTM Co., Ltd.), 7 wt % of a bifunctional urethane acrylate-based oligomer (KS1113, Mw: about 37,000, LG CHEM), 10 wt % of a tetrafunctional urethane acrylate-based oligomer (KS1122, LG CHEM), 30 wt % of an adhesive promoter (ARAKAWA Chemical, P-90), 18 wt % of a plasticizer (non-phthalates, BASF, DINCH), 7 wt % of hydroxy butyl acrylate (Osaka Organic Chemical Industry Ltd.), and other additives such as a photoinitiator.

Comparative Example 1

An adhesive composition for optical use with a total content of a monofunctional urethane acrylate-based oligomer and a polyfunctional urethane acrylate-based oligomer being 20 wt % was prepared by including 25 wt % of isobornyl acrylate, 2 wt % of isobornyl methacrylate, 4 wt % of a monofunctional urethane acrylate-based oligomer (NS017, Mw: about 17,000, BNTM Co., Ltd.), 16 wt % of a bifunctional urethane acrylate-based oligomer (KS1113, Mw: about 37,000, LG CHEM), 32 wt % of an adhesive promoter (ARAKAWA Chemical, P-90), 16 wt % of a plasticizer (non-phthalates, BASF, DINCH), 4 wt % of hydroxy butyl acrylate (Osaka Organic Chemical Industry Ltd.), and other additives such as a photoinitiator.

Comparative Example 2

An adhesive composition for optical use with a total content of a monofunctional urethane acrylate-based oligomer and a polyfunctional urethane acrylate-based oligomer being 20 wt % was prepared by including 15 wt % of isobornyl acrylate, 2 wt % of isobornyl methacrylate, 17 wt % of a monofunctional urethane acrylate-based oligomer (NS017, Mw: about 17,000, BNTM Co., Ltd.), 3 wt % of a bifunctional urethane acrylate-based oligomer (KS1113, Mw: about 37,000, LG CHEM), 40 wt % of an adhesive promoter (ARAKAWA Chemical, P-90), 18 wt % of a plasticizer (non-phthalates, BASF, DINCH), 4 wt % of hydroxy butyl acrylate (Osaka Organic Chemical Industry Ltd.), and other additives such as a photoinitiator.

Comparative Example 3

An adhesive composition for optical use, including 25 wt % of isobornyl acrylate, 4 wt % of isobornyl methacrylate, 20 w % of a monofunctional urethane acrylate-based oligomer (NS017, Mw: about 17,000, BNTM Co., Ltd.), 30 wt % of an adhesive promoter (ARAKAWA Chemical, P-90), 15 wt % of a plasticizer (non-phthalates, BASF, DINCH), 4 wt % of hydroxy butyl acrylate (Osaka Organic Chemical Industry Ltd.), and other additives such as a photoinitiator, was prepared.

Comparative Example 4

An adhesive composition for optical use, including 24 wt % of isobornyl acrylate, 4.5 wt % of isobornyl methacrylate, 27 w % of a bifunctional urethane acrylate-based oligomer (KS1113, Mw: about 37,000, LG CHEM), 20 wt % of an adhesive promoter (ARAKAWA Chemical, P-90), 12 wt % of a plasticizer (non-phthalates, BASF, DINCH), 4 wt % of hydroxy butyl acrylate (Osaka Organic Chemical Industry Ltd.), and other additives such as a photoinitiator, was prepared.

Comparative Example 5

An adhesive composition for optical use with a total content of the monofunctional urethane acrylate-based oligomer and the polyfunctional urethane acrylate-based oligomer being 23 wt % was prepared by including 21.5 wt % of isobornyl acrylate, 8 wt % of a monofunctional urethane acrylate-based oligomer (NS017, Mw: about 17,000, BNTM Co., Ltd.), 15 wt % of a bifunctional urethane acrylate-based oligomer (KS1113, Mw: about 37,000, LG CHEM), 28 wt % of an adhesive promoter (ARAKAWA Chemical, P-90), 18.5 wt % of a plasticizer (non-phthalates, BASF, DINCH), and other additives such as a photoinitiator.

Comparative Example 6

An adhesive composition for optical use with a total content of the monofunctional urethane acrylate-based oligomer and the polyfunctional urethane acrylate-based oligomer being 20 wt % was prepared by including 18 wt % of isobornyl acrylate, 4.5 wt % of isobornyl methacrylate, 5 wt % of a monofunctional urethane acrylate-based oligomer (NS017, Mw: about 17,000, BNTM Co., Ltd.), 15 wt % of a bifunctional urethane acrylate-based oligomer (KS950, Mw: about 25,000, LG CHEM), 28 wt % of an adhesive promoter (ARAKAWA Chemical, P-90), 15 wt % of a plasticizer (non-phthalates, BASF, DINCH), and other additives such as a photoinitiator.

Comparative Example 7

An adhesive composition for optical use, including 25 wt % of isobornyl acrylate, 36 w % of a bifunctional urethane acrylate-based oligomer (KS1113, Mw: about 37,000, LG CHEM), 15 wt % of an adhesive promoter (ARAKAWA Chemical, P-90), 9 wt % of a plasticizer (non-phthalates, BASF, DINCH), and other additives such as a photoinitiator, was prepared.

TABLE 1

|  | Monofunctional urethane acrylate-based oligomer (wt %) | Bifunctional urethane acrylate-based oligomer (wt %) | Tetrafunctional urethane acrylate-based oligomer (wt %) | Adhesive promoter (wt %) | Plasticizer (wt %) | Hydroxy butyl acrylate (wt %) |
|---|---|---|---|---|---|---|
| Example 1 | 5.5 | 15.5 | — | 30 | 15 | 4 |
| Example 2 | 6 | 7 | 10 | 30 | 18 | 7 |
| Comparative Example 1 | 4 | 16 | — | 32 | 16 | 4 |
| Comparative Example 2 | 17 | 3 | — | 40 | 18 | 4 |
| Comparative Example 3 | 20 | — | — | 30 | 15 | 4 |
| Comparative Example 4 | — | 27 | — | 20 | 12 | 4 |
| Comparative Example 5 | 8 | 15 | — | 28 | 18.5 | — |
| Comparative Example 6 | 5 | 15 | — | 28 | 15 | — |
| Comparative Example 7 | — | 36 | — | 15 | 9 | — |

EVALUATION

Experimental Example 1: Primary Photo-Cure Shrinkage

A difference between a height in a composition state and a height during the primary photo-curing was measured by applying the adhesive composition for optical use, which was prepared by each of the Examples and the Comparative Examples, onto a circular frame with a diameter of 1 cm and a height of 1 mm, irradiating the adhesive composition for optical use with UV with an illuminance of 100 mW/cm$^2$ and a dose of 500 mJ/cm$^2$ using an LED lamp from the lower part, and using EU201 manufactured by SENTECH, and then a primary photo-cure shrinkage was calculated by using the following Equation 1.

Primary photo-cure shrinkage=Volume after primary photo-curing/Volume in a state of an adhesive composition for optical use×100(%)  <Equation 1>

Experimental Example 2: Secondary Photo-Cure Shrinkage

A difference between a height in a composition state after the secondary photo-curing and a height after the secondary photo-curing was measured by applying the adhesive composition for optical use, which was prepared by each of the Examples and the Comparative Examples, onto a circular frame with a diameter of 1 cm and a height of 1 mm, irradiating the adhesive composition for optical use with UV with an illuminance of 250 mW/cm² and a dose of 6,000 mJ/cm² using a mercury lamp from the lower part, and using EU201 manufactured by SENTECH, and then a secondary photo-cure shrinkage was calculated by using the following Equation 2.

Secondary photo-cure shrinkage=Volume after secondary photo-curing/Volume in a state of an adhesive composition for optical use×100(%)    <Equation 2>

Experimental Example 3: Evaluation of Whitening Phenomenon

The adhesive composition for optical use, which was prepared by each of the Examples and the Comparative Examples, was applied to have a thickness of about 150 um on glass with 8 cm×14 cm×0.11 cm at the lower portion, and then a primary photo-curing was performed by irradiating the applied adhesive composition with UV with an illuminance of 100 mW/cm² and a dose of 500 mJ/cm² using an LED lamp, the upper portion was covered with glass with cm×14 cm×0.11 cm, a secondary photo-curing was performed by irradiating the glass with UV with an illuminance of 250 mW/cm² and a dose of 6,000 mJ/cm² using a mercury lamp, and then the sample was left to stand for 10 days in a thermohydrostat (85° C./85% RH), and then a haze value was measured by using a haze meter (Haze guard plus, manufactured by BYK). It is preferred that a measured value is low and whether the whitening occurs is determined through the measured value. (When the value is less than 0.5, it is determined that no whitening phenomenon occurs.)

Experimental Example 4: Evaluation of Viscosity

About 0.5 mL of the adhesive composition for optical use, which was prepared in each of the Examples and the Comparative Examples, was collected and applied, and then the viscosity at 25° C. was measured by using a DV2T viscometer manufactured by Brookfield Engineering Laboratories Inc.

Experimental Example 5: Evaluation of Hardness

The adhesive composition for optical use, which was prepared in each of the Examples and the Comparative Examples, was applied to a circular frame with a diameter of 20 mm and a height of 5 mm and cured, and then the hardness at room temperature was measured by using an Asker C durometer.

TABLE 2

|  | Viscosity (cPs, 25° C.) | Hardness (Asker C) | Primary photo-cure shrinkage (%, a) | Secondary photo-cure shrinkage (%, b) | Photo-cure shrinkage (%, b − a) | Haze value |
|---|---|---|---|---|---|---|
| Example 1 | 5101 | 17.3 | 3.11 | 3.95 | 0.84 | 0.06 |
| Example 2 | 5107 | 17.2 | 3.7 | 4.22 | 0.52 | 0.07 |
| Comparative Example 1 | 5107 | 16.7 | 2.34 | 4.34 | 2 | 0.07 |
| Comparative Example 2 | 4784 | 10.6 | 1.87 | 3.25 | 1.38 | 0.12 |
| Comparative Example 3 | 5005 | 14.8 | 3.49 | 6.8 | 3.31 | 0.11 |
| Comparative Example 4 | 5031 | 14 | 4.74 | 7.86 | 3.12 | 0.04 |
| Comparative Example 5 | 4280 | 14 | 3.21 | 3.72 | 0.51 | 1.64 |
| Comparative Example 6 | 490 | 16.8 | — | — | — | — |
| Comparative Example 7 | 11930 | 24.9 | — | — | — | — |

The adhesive compositions for optical use, which were prepared according to Examples 1 and 2, maintain the primary photo-cure shrinkage and the secondary photo-cure shrinkage of 4% and 4.5% or less, respectively, which are at an appropriate level, and particularly, the differences between the primary photo-cure shrinkage and the secondary photo-cure shrinkage were 0.84% and 0.52%, respectively, and accordingly, excellent reliability and durability of a product may be implemented due to a small deformation even after the photo-curing. In addition, since the adhesive compositions for optical use, which were prepared in Examples 1 and 2, had a haze value of 0.06 and 0.07, respectively, no whitening phenomenon occurred, and as a result, it can be confirmed that the visibility is excellent.

In contrast, in the case of Comparative Examples 1 to 4, the difference between the primary photo-cure shrinkage and the secondary photo-cure shrinkage was more than 1.3%, and as a result, it can be confirmed that there is a concern in that the product is deformed, and dimensional stability may deteriorate. In the case of Comparative Example 5, the difference between the primary photo-cure shrinkage and the secondary photo-cure shrinkage was 0.51%, which was low, but the haze value was 1.64 and the whitening phenomenon occurred, and accordingly, it can be confirmed that the visibility deteriorates. In the case of Comparative Example 6, the bifunctional urethane acrylate-based oligomer had a weight average molecular weight (Mw) of less than 30,000 and there occurred difficulty in adjusting the viscosity of the liquid phase, and accordingly, the experiment could not be carried out any more because the process could not proceed. In the case of Comparative Example 7, only the polyfunctional urethane acrylate-based oligomer was used, the total content of the urethane acrylate-based oligomer is so extremely high that the viscosity and the hardness were extremely increased, and as a result, the experiment could not be carried out any more because the process could not proceed.

EXPLANATION OF REFERENCE NUMERALS AND SYMBOLS

100: Image display device
110: Image display unit
120: Protective unit
121: Light shielding unit
130: Bonding layer
140: Fixing jig

The invention claimed is:

1. An adhesive composition for optical use, the adhesive composition comprising:
   a monofunctional urethane (meth)acrylate-based oligomer; and
   a polyfunctional urethane (meth)acrylate-based oligomer,
   wherein a weight ratio of the monofunctional urethane (meth)acrylate-based oligomer and the polyfunctional urethane (meth)acrylate-based oligomer is 1:2 to 1:3,
   wherein the monofunctional urethane (meth)acrylate-based oligomer has a weight average molecular weight (Mw) of 10,000 g/mol to 20,000 g/mol and
   wherein the polyfunctional urethane (meth)acrylate-based oligomer has a weight average molecular weight (Mw) of 30,000 g/mol to 40,000 g/mol.

2. The adhesive composition of claim 1, wherein the monofunctional urethane (meth)acrylate-based oligomer comprises one or more selected from the group consisting of a polybutadiene urethane (meth)acrylate oligomer, an epoxy urethane (meth)acrylate oligomer, a polyester urethane (meth)acrylate oligomer, and a polyether urethane (meth)acrylate oligomer.

3. The adhesive composition of claim 1, wherein the polyfunctional urethane (meth)acrylate-based oligomer comprises one or more selected from the group consisting of a polybutadiene urethane (meth)acrylate oligomer, an epoxy urethane (meth)acrylate oligomer, a polyester urethane (meth)acrylate oligomer, and a polyether urethane (meth)acrylate oligomer.

4. The adhesive composition of claim 1, wherein a total content of the monofunctional urethane (meth)acrylate-based oligomer and the polyfunctional urethane (meth)acrylate-based oligomer is 9 wt % to 30 wt % based on the adhesive composition for optical use.

5. The adhesive composition of claim 1, wherein the adhesive composition for optical use further comprises a hydroxy group-containing (meth)acrylate-based monomer.

6. The adhesive composition of claim 5, wherein the hydroxy group-containing (meth)acrylate-based monomer comprises one or more selected from the group consisting of 2-hydroxyethyl (meth)acrylate, 4-hydroxybutyl (meth)acrylate, 2-hydroxypropyl (meth)acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate.

7. The adhesive composition of claim 5, wherein a content of the hydroxy group-containing (meth)acrylate-based monomer is 3 wt % to 8 wt % based on the adhesive composition for optical use.

8. The adhesive composition of claim 1, wherein the adhesive composition for optical use further comprises one or more selected from the group consisting of an alkyl group-containing (meth)acrylate-based monomer and a cycloalkyl group-containing (meth)acrylate-based monomer.

9. The adhesive composition of claim 8, wherein the contents of the alkyl group-containing (meth)acrylate-based monomer and the cycloalkyl group-containing (meth)acrylate-based monomer are each 20 wt % to 40 wt % based on the adhesive composition for optical use.

10. The adhesive composition of claim 1, wherein the adhesive composition for optical use further comprises one or more additives selected from the group consisting of a plasticizer, an adhesive promoter, and a photoinitiator.

11. The adhesive composition of claim 10, wherein the plasticizer comprises one or more selected from the group consisting of an epoxy-based plasticizer, a fatty acid ester-based plasticizer, a polyester-based plasticizer, a polybutadiene-based plasticizer, and an ether-based plasticizer.

12. The adhesive composition of claim 10, wherein a content of the plasticizer is 10 wt % to 20 wt % based on the adhesive composition for optical use.

* * * * *